United States Patent [19]

Yang

[11] Patent Number: 5,387,162

[45] Date of Patent: Feb. 7, 1995

[54] PLANETARY WORM TYPE GEAR AND APPLICATION DEVICE

[76] Inventor: Tai-Her Yang, 5-1 Taipin St., Si-Hu Town, Dzan-Hwa, Taiwan, Prov. of China

[21] Appl. No.: 67,942

[22] Filed: May 27, 1993

[51] Int. Cl.⁶ .................. F16H 55/24; F16H 1/16
[52] U.S. Cl. ................................ 475/333; 74/409
[58] Field of Search .............. 475/331, 333; 74/409

[56] References Cited

U.S. PATENT DOCUMENTS

| | | | |
|---|---|---|---|
| 781,944 | 2/1905 | Hall | 475/333 X |
| 2,208,614 | 7/1940 | Watson | 475/333 X |
| 2,765,668 | 10/1956 | Milne | 74/409 |
| 2,877,658 | 3/1959 | Anthony | 74/409 |
| 3,006,211 | 10/1961 | Mueller | 74/409 |
| 5,232,415 | 8/1993 | Brewer et al. | 475/333 |

FOREIGN PATENT DOCUMENTS

| | | | |
|---|---|---|---|
| 4-25657 | 1/1992 | Japan | 74/409 |
| 4-25658 | 1/1992 | Japan | 74/409 |
| 5-118409 | 3/1993 | Japan | 74/409 |

*Primary Examiner*—Edward K. Look
*Assistant Examiner*—Michael S. Lee
*Attorney, Agent, or Firm*—Bacon & Thomas

[57] ABSTRACT

A planetary worm type gear system in which an integrated worm type gear on a first shaft is driven by a worm set on another shaft, or a separate coaxially driven worm and gear set. The planetary worm type gear system has two or more worm-gears coupled to a ring type internal worm set, and a shaft driven by the ring type internal worm set for output. Alternatively, a rotor arm around the shaft may be driven by the two or more worm gears for rotary output, or both can be driven for differential output.

10 Claims, 5 Drawing Sheets

PLANETARY WORM TYPE GEAR AND APPLICATION DEVICE

BACKGROUND OF THE INVENTION

A conventional multi-block worm gear reduction device typically has a worm-gear on a first shaft driven by a first worm on another shaft and a second worm-gear on a third shaft driven by the worm on the first shaft for output. In other words, it has at least two worms and two worm-gears coupled to each other.

SUMMARY OF THE INVENTION

The present invention relates to a planetary worm type gear in which an integrated worm type gear on the first shaft is driven by a worm set on another shaft, or a separate coaxially driven worm and gear set. A planetary worm type gear system comprises two or more worm-gears coupled to a ring type internal worm set, and a shaft driven by the ring type internal worm set for output. Alternatively, a rotor arm around the shaft may be driven by the two or more worm gears for rotary output, or both driven for differential output. The invention minimizes the components, exerts a radial repulsive force against the two or more worm-gears and reduces the dimensions and weight of the system.

DETAILED DESCRIPTION OF THE PREFERRED EMBODIMENTS

Figure 1:
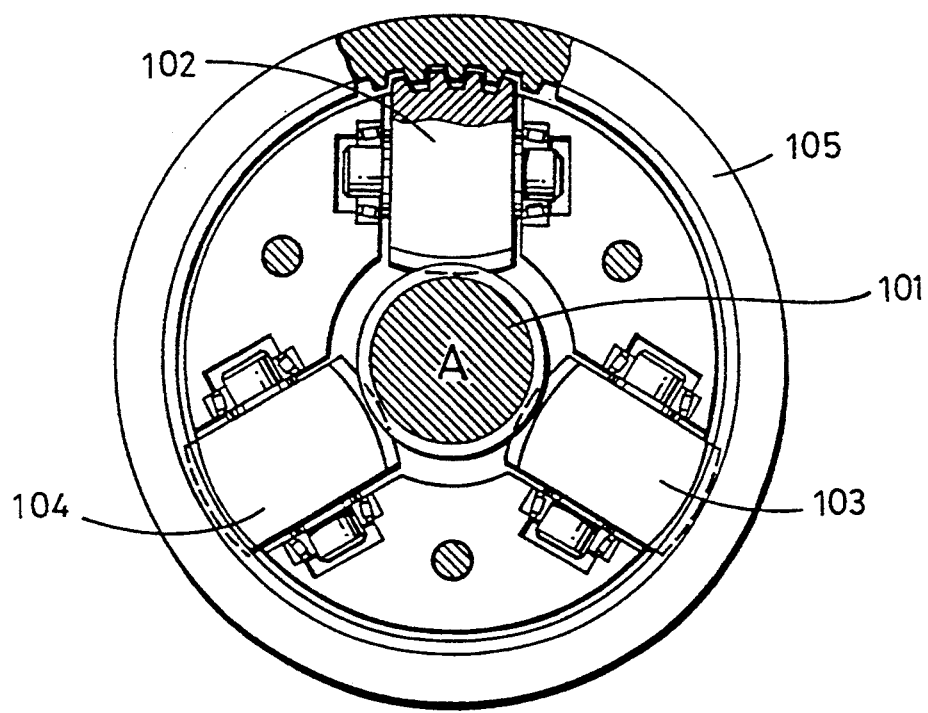
FIG. 1 is a front view showing a first embodiment of the present planetary worm type gear system.
Figure 2:
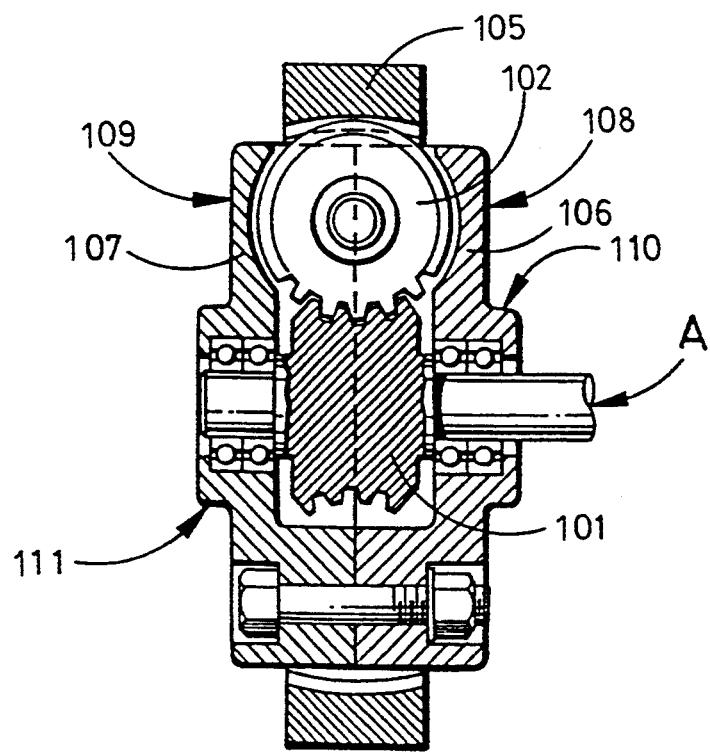
FIG. 2 is a side view of the system of FIG. 1.

FIG. 1 is a front view showing a first embodiment of the present planetary worm type gear system, and FIG. 2 is a side cross-sectional view of FIG. 1. It can be seen that drive shaft A has drive worm 101 attached thereto for coupling with three planetary worm type gears 102, 103, 104 epicyclically mounted around the drive worm 101. Although three worm type gears are shown, two or more planetary worm type gears may be used. The planetary worm type gears are mounted around a spiral on the surface of a circular cylinder along an axial line as the center, for coupling with external gear 105. The spiral extends along the axial line and intermediately forms a worm type toothed groove in an inverted circular arc for coupling with the drive worm 101. The internal worm type teeth of the external gear 105 are for coupling with the spirals on each planetary worm type gears 102, 103 and 104 along the axial line of worm type gear as a center. Steady frames 106, 107 are for mounting each planetary gear and for keeping steady the shaft of each planetary gear. For the differential input/output or for secure locking for the planetary gears, the end faces 108, 109 or circular supports 110, 111 for shaft A of the steady frames can be provided as input/output interfaces. Holes, pins, threaded holes or other mechanical interface structures may be mounted between each planetary worm type gear on the steady frame, for input/output or for secure locking.

Figure 3:
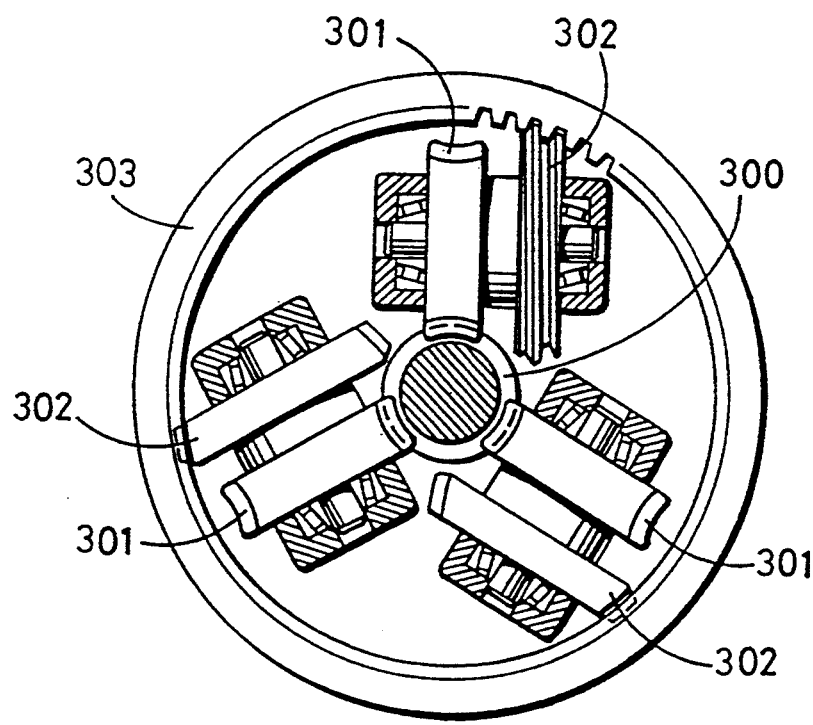
FIG. 3 is a front view showing a second embodiment of the present planetary worm type gear system.
Figure 4:
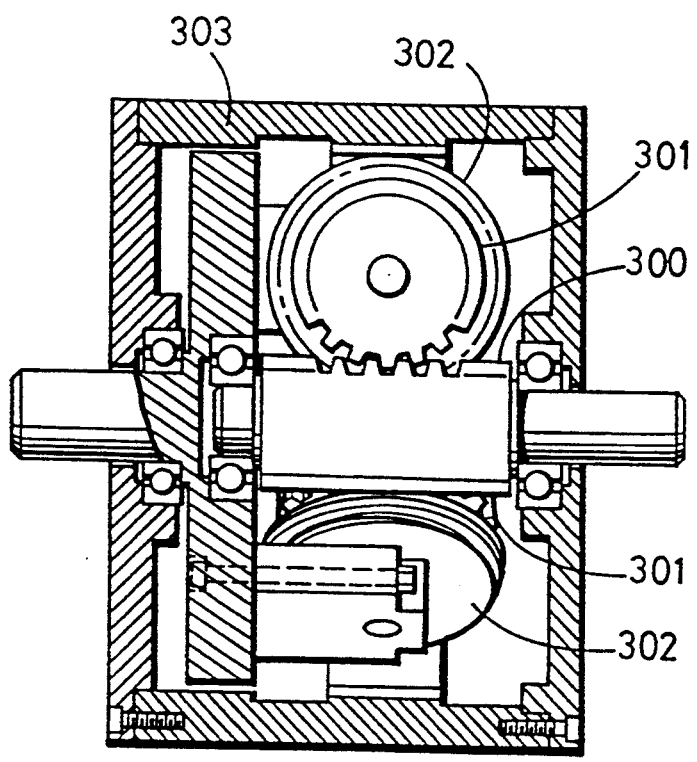
FIG. 4 is a side view of the system of FIG. 3.

FIG. 3 is a front view showing the embodiment of the present planetary worm type gear constructed with a separative type structure. FIG. 4 is a side view of the structure of FIG. 3 wherein the planetary gearing members consisting of block type worm and gear sets are used in place of the planetary worm type gear previously described. The block type worm and gear set includes worm-gear 301 engaged with the drive worm 300 and coaxially attached or integrally molded worm 302. Worm 302 is coupled with the external gear 303. The means of connection between the worms 301 and the coaxially connected worms 302 may include a pin, key, screw, welding or other secure connecting methods. In addition, the worm-gears 301 and the worms 302 may be made with an axially displaceable box shaft and a counter coupling hole or key slot type structure, and a pre-compressed spring may be fitted in between each worm-gear 301 and a corresponding worm 302 to form a pre-compressed pressure between the worm 302 and external gear 303 for eliminating back lash.

Figure 5:
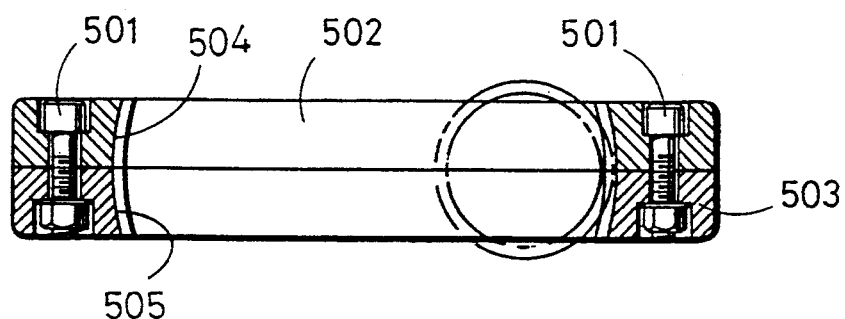
FIG. 5 is a cross-sectional view of a two-piece type external gear structure taken along a split line.
Figure 6A:
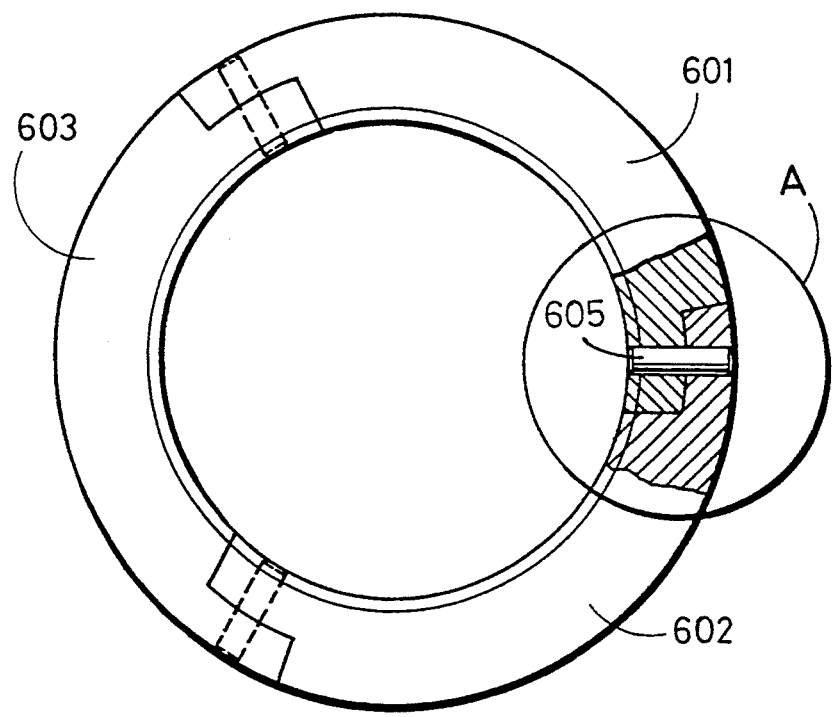
FIG. 6A is a front view, partially broken away showing a multi-block arc type external gear structure.
Figure 6B:
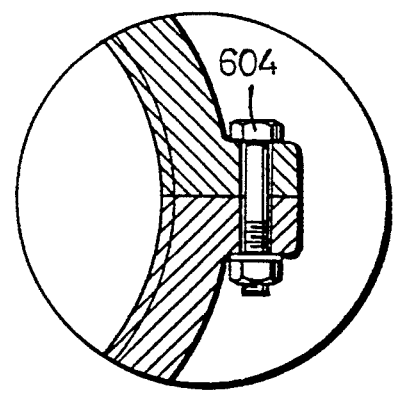
FIG. 6B is a partial cross-sectional view of area A in FIG. 6A illustrating an alternative segment fastener.
Figure 7A:
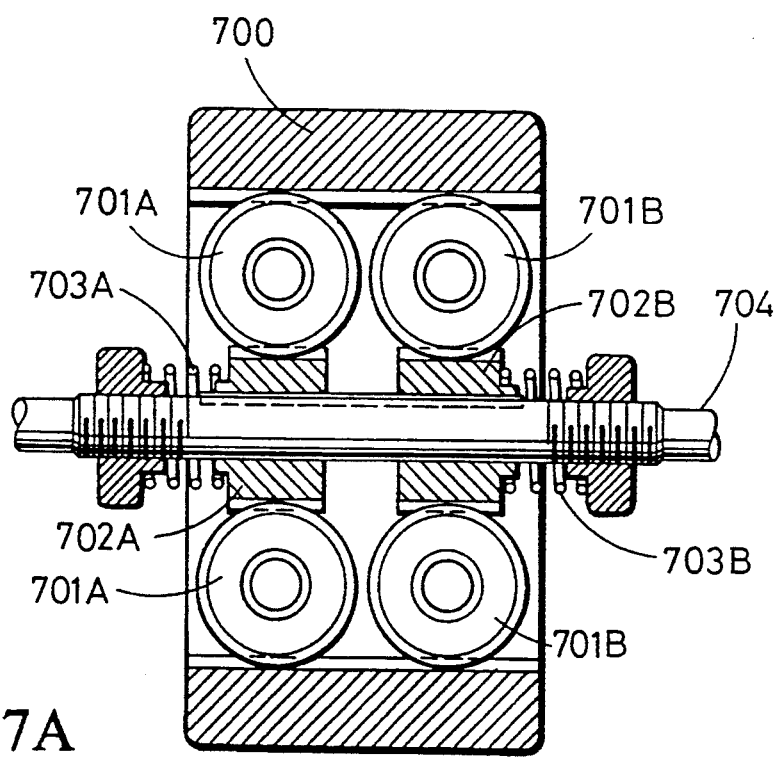
FIG. 7A is a cross-sectional view showing a third embodiment of the planetary worm type gear having parallel planetary worms.
Figures 7B, 7C:
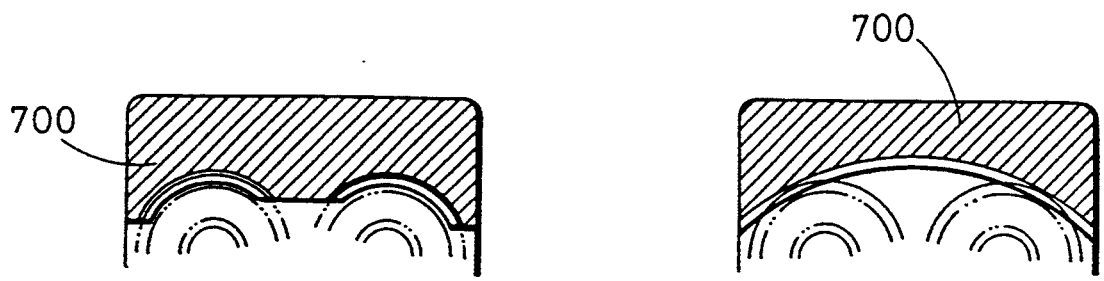
FIGS. 7B and 7C are partial cross-sectional views illustrating other alternative configurations for the external gear of FIG. 7A.
Figure 7D:
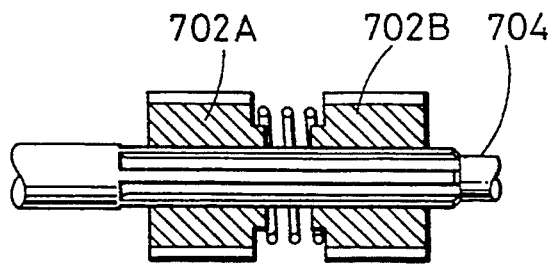
FIG. 7D is a partial cross-sectional view of an alternative configuration of the worms in FIG. 7A.

Referring to FIGS. 1 thru 4, the coupling teeth of the external gear 105,303 and the planetary worms may be straight-tooth internal gear or outward intermediate recessed arc gear to facilitate assembly. The intermediate recessed arc toothed external gear may be constructed of a two-piece structure connected together along a split line as shown in FIG. 5 wherein the two-piece structure 502, 503 has arc worm-gears 504 and 505 and are secured together by means of a screw 501 or other device. The external gear may also be constructed as three segment arc assemblies 601,602, 603 having multi-block arc worm-gears to facilitate assembly. FIGS. 6A and 6B show the multi-block arc type integrated external gear structure wherein the arc external gear segments are securely fastened together by means of a bolt and nut of by pin 605 inserted in the connection. The number of segments may be two or more than two subject to specific individual requirements.

The present invention may further appear in the form of a structure with back lash elimination. FIGS. 7A-7D are views showing the instant planetary worm type gear system having at least two parallel sets of planetary worms 701A and 701B which are coupled to the external gear 700. Each planetary worm is respectively coupled with a counter independent and axial sun worm 702A or 702B. Pre-compressed springs 703A and 703B acting on each sun worm 702A or 702B exert tension or clamping type pre-compressing force upon the independent worms, whereby the sun worms 702A and 702B are slidingly coupled to the drive shaft 704 by means of a key slot coupling structure to force the planetary worm-gears and external gear to move so as to eliminate back lash. The aforesaid structures also included the following forms:

(1) The planetary worm-gears may comprise a one-piece type or a two-piece type in which the worm and worm-gear are coaxially and separatively mounted;

(2) Two or more planetary worm-gears may parallel or cross coupled to the external gear;

(3) Each sun worm may be fully or partly axially slidable along the drive shaft by means of a key slot coupling with the drive shaft and is forced to move by a pre-compressed spring;

(4) The internal teeth of the external gear may be straight teeth, intermediate recessed arc teeth or independent arc teeth for coupling with each parallel planetary worm;

(5) The relationship of each parallel planetary worm and the internal teeth of the external inner worm-gear, the direction of the drive sun worm and the mounting relationship of the pre-compressed spring relates to the external inner worm-gear driven by the drive shaft to eliminate back lash;

(6) The output means may include the output from the external gear when the framework of the planetary worm gears are secured; or the sun gear may be secured and the output is from the framework, or both are outputs in a differential manner.

Figure 8:
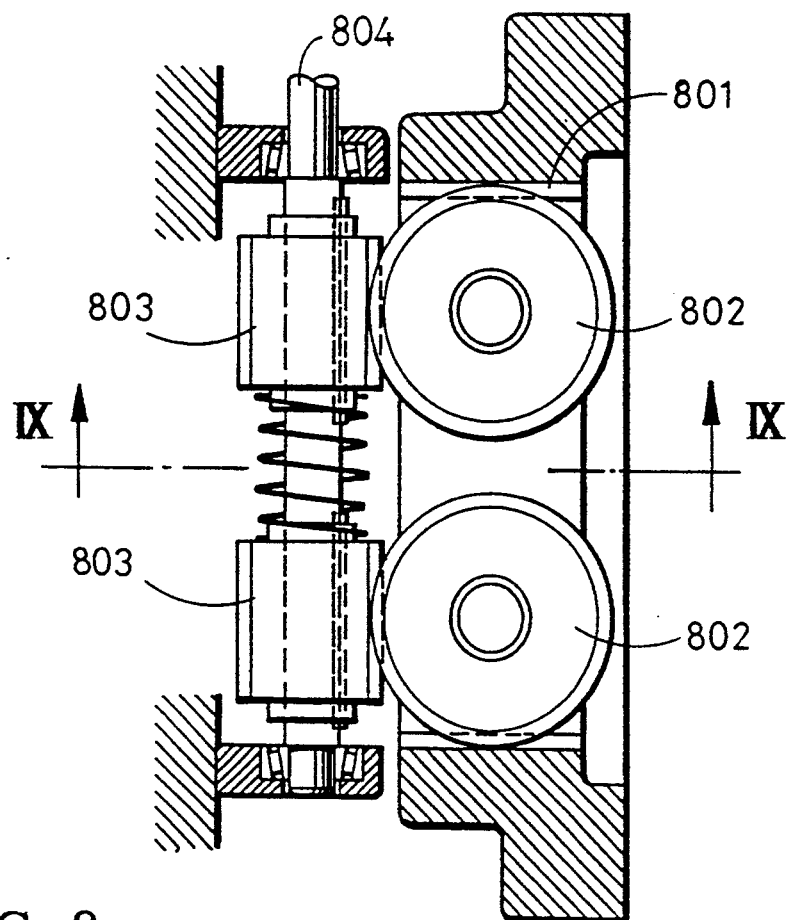
FIG. 8 is a cross-sectional view showing a fourth embodiment of the present planetary worm type gear having a parallel input worm consisting of sidewise worms.
Figure 9:
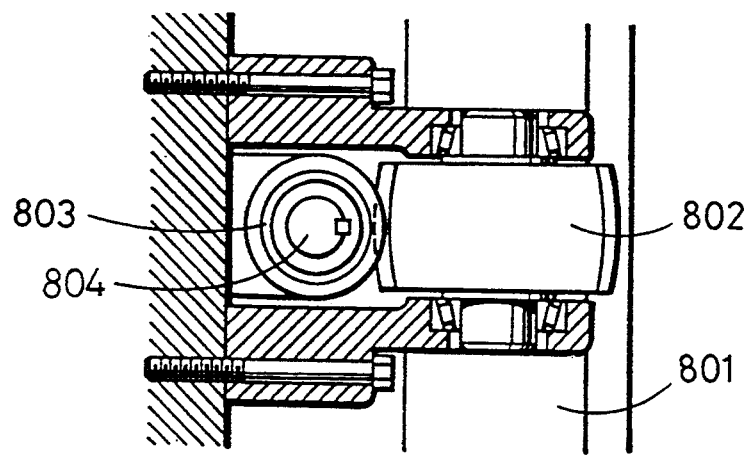
FIG. 9 is a cross-sectional view taken along line IX—IX in FIG. 8.

FIG. 8 is a view showing the present planetary worm type gear system having a parallel input worm consisting of sidewise worms 803. FIG. 9 is a cross-sectional view of FIG. 8. As can be seen, an external worm-gear 801 engages two planetary worm type gears 802 having worm spiral and worm-gear, which are coupled to the inside teeth of the external worm-gear by means of a spiral worm function and coupled with the input worm set 803 by means of a worm-gear function. The input worm set 803 has two directional spiral threads respectively coupling and gearing the two planetary worm type gears for engagement with the external teeth. As a practical matter, we may extend its application by means of the following changes:

the planetary worm type gears may be one-piece type having spiral and worm-gear structure, or may be a two-piece type having linking coaxial driving by means of a worm-gear coupled to the input shaft and the worm set coupled to the external teeth;

the means of output includes: output from the external gear while the planetary worm type gear frame is secured; or the sun gear is secured while the planetary worm type gear from the output, or both output in a differential manner;

the aforesaid structure may further have a key slot on the input shaft 804 with an axially slidable key for coupling the shaft 804 with either or both input worms 803 set for axially sliding wherein one or both input worm is forced to move by the pre-compressed spring, such that one or both are mutually urged together, forcibly separated, or forced to move in the same direction.

The selection of outputs and inputs of the various structure forms as shown in FIGS. 1 thru 9 may include:

If the spiral angle between the overall worm type gear is reversible gearing, the planetary worm type gear, center sun worm, external gear, or any one or two of them may be selected as the input or output side whereby the structure form may have reversible gearing characteristics;

If the overall worm type gear has an irreversible gearing spiral angle, the center sun worm is provided for drive input only.

For practical application, the present worm type gear system may further be extended to a multi-level compound gear train or a parallel gear train and be used in combination with other gearing components.

I claim:

1. A planetary worm type gear system comprising:
a) a shaft having a plurality of sun worms attached thereto so as to rotate therewith, at least one sun worm of the plurality of sun worms being axially movable relative to the shaft;
b) a plurality of sets of parallel planetary worms, each set having a plurality of worms each in engagement with one of the plurality of sun worms;
c) an external gear having internal worm teeth in engagement with each of the worms of the plurality of sets of planetary worms; and
d) anti back lash means comprising pre-compressed spring means acting on the at least one axially movable sun worm urging the at least one axially movable sun worm in a direction to eliminate back lash in the gear system.

2. The planetary worm type gear system of claim 1 wherein the external gear comprises:
a) a plurality of arc shaped segments; and
b) fastening means to fasten the arc shape segments together.

3. The planetary worm type gear system of claim 2 wherein adjacent arc shaped segments have overlapping portions and wherein the fastening means comprises a pin inserted through aligned holes defined by the overlapping portions.

4. The planetary worm type gear system of claim 2 wherein each adjacent arc shaped segment has a flange and wherein the fastening means comprises a threaded fastener extending through adjacent flanges.

5. The planetary worm type gear system of claim 1 wherein the external gear comprises mating portions having mating surfaces extending in a circumferential direction around the mating portions and further comprising fastening means to fasten the mating portions together.

6. The planetary worm type gear system of claim 1 wherein each planetary worm has an integral, one-piece construction.

7. The planetary worm type gear system of claim 1 wherein each planetary worm comprises:
a) a worm gear engaged with one of the plurality of sun worms; and
b) a worm attached to the worm gear so as to rotate therewith, the worm engaged with the external gear.

8. The planetary worm type gear system of claim 1 wherein the internal worm teeth are arc shaped.

9. The planetary worm type gear system of claim 1 wherein the internal worm teeth are straight teeth.

10. The planetary worm type gear system of claim 1 wherein the external gear comprises a plurality of facing internal worm teeth in engagement with the worms of the plurality of sets of the planetary worms.

* * * * *